(12) United States Patent
Moller et al.

(10) Patent No.: US 6,801,991 B2
(45) Date of Patent: Oct. 5, 2004

(54) METHOD AND APPARATUS FOR BUFFER PARTITIONING WITHOUT LOSS OF DATA

(75) Inventors: Hanan Z. Moller, Austin, TX (US);
David P. Sonnier, Austin, TX (US);
Christopher Koob, Pflugerville, TX (US)

(73) Assignee: Agere Systems Inc., Allentown, PA (US)

( * ) Notice: Subject to any disclaimer, the term of this patent is extended or adjusted under 35 U.S.C. 154(b) by 246 days.

(21) Appl. No.: 10/037,163

(22) Filed: Dec. 21, 2001

(65) Prior Publication Data

US 2003/0120886 A1 Jun. 26, 2003

(51) Int. Cl.[7] .............................................. G06F 12/02
(52) U.S. Cl. ...................................................... 711/173
(58) Field of Search ................................. 711/170, 173

(56) References Cited

U.S. PATENT DOCUMENTS

| | | |
|---|---|---|
| 4,169,289 A | 9/1979 | Shively |
| 5,860,149 A | 1/1999 | Fiacco et al. |
| 5,956,492 A * | 9/1999 | Jander et al. ................ 710/106 |
| 6,233,651 B1 * | 5/2001 | O'Neill et al. .............. 711/101 |
| 6,381,659 B2 * | 4/2002 | Proch et al. .................. 710/57 |

FOREIGN PATENT DOCUMENTS

| | | |
|---|---|---|
| GB | 2 317 475 A | 3/1998 |
| GB | 2 371 641 A | 7/2002 |

* cited by examiner

*Primary Examiner*—Kevin L. Ellis

(57) ABSTRACT

An apparatus and method for moving and/or resizing logical buffers that comprise a memory space without the loss of data. Each buffer comprises a linear and contiguous set of storage locations, and operates according to a FIFO priority scheme, using a read address pointer to indicate the location from which data is read from the buffer and a write address pointer indicating the address into which data is written. A buffer is relocated or resized within the memory space by changing the base location address (defining the lowest storage location comprising the buffer) and/or the top location address (defining the highest memory location within the buffer) into free storage locations. To accomplish this relocation or resizing without the loss of data, the read address is first checked to determine if it bears an appropriate relationship to the new base and top memory locations.

21 Claims, 6 Drawing Sheets

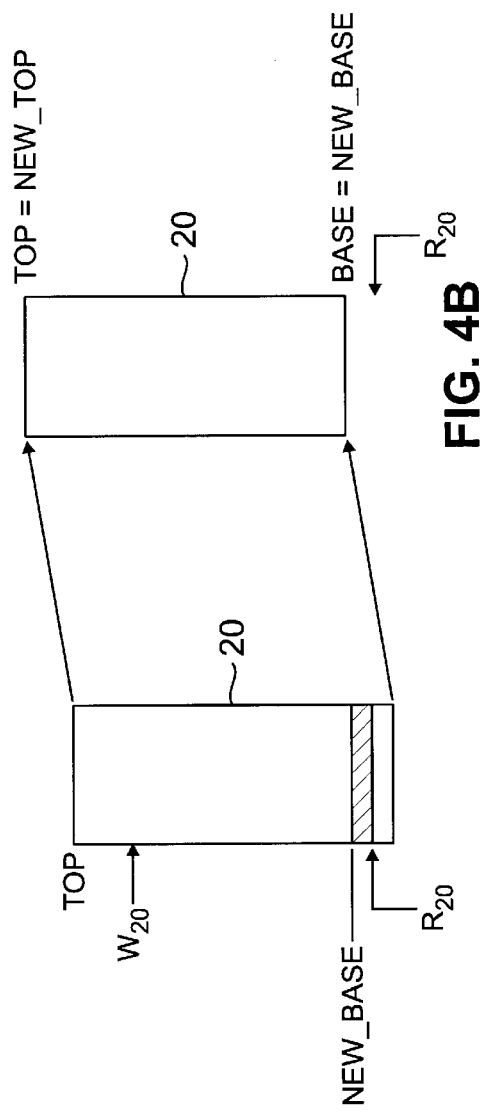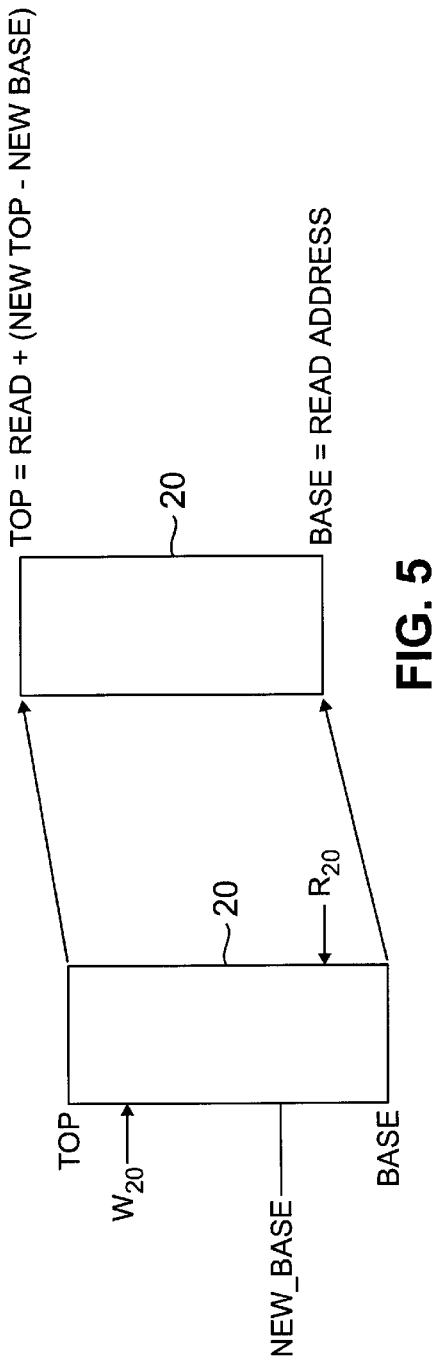

METHOD AND APPARATUS FOR BUFFER PARTITIONING WITHOUT LOSS OF DATA

FIELD OF THE INVENTION

The present invention relates generally to the data storage in buffers, and more particularly to a method and apparatus for partitioning an active buffer without loss of data stored in the buffer.

BACKGROUND OF THE INVENTION

Buffer storage is a common element in computer systems and data networks. A computer system buffers data as it awaits service by a resource. For instance, a printer cannot process data at the same rate that it is provided by the processor, so the data is buffered until the printer is ready to process it. A data network requires buffers to hold data as it awaits access to a network processor. For example, network switches typically include an input buffer on each input line and an output buffer on each output line, with the switch fabric interposed between them. The input buffers store packets as they arrive on the input lines while the packets contend for service by the switch. The input buffer size is dependent on the switch capacity and the characteristics of the data network. But once the input buffer size is established, it is not easily modified, especially while the system is operational. Similarly the output buffers store output data traffic from the switch while it contends for access to the output line. Situations may develop where data traffic reaches an unusually high level, at which time it may be necessary for the input or the output buffer to drop one or more packets. This results in network inefficiency as the dropped packets must be resent from the data source.

Typically, buffers associated with network processors are implemented by logically segmenting a single memory space in the network processor. This memory space is partitioned to form multiple logical buffer areas, which are then assigned to serve a required role, such as an input buffer or an output buffer. In certain applications these buffers operate on a first-in-first-out (FIFO) basis and comprise a linear array of memory locations. In a FIFO buffer the next packet or block that is transferred into the network processor is the most recent packet that arrived at the buffer. According to the prior art, FIFO buffers are not resizable while data is present in the buffer. Therefore the data traffic must be halted to resize the buffer.

One common prior art buffer storage technique that allows dynamic buffer repartitioning or resizing uses link lists that identify the memory storage spaces that comprise a logical buffer. The entire memory space is partitioned into equal-size allocation units, and each one is uniquely identified, according to the allocation unit's first and last address within the memory space. An allocation manager assigns allocation units to individual logical buffers. Most logical buffers comprise more than one allocation unit and thus the allocation manager creates a list of the allocation units within each buffer. Further, the lists are linked within the allocation manager to form an ordered chain of allocation units in the logical buffer. Once the linked-lists are created, the allocation manager offers the flexibility to change the logical buffers sizes by adding or deleting allocation units to a logical buffer and correspondingly changing the linked-lists. When a new allocation unit is added to the linked list the previous final linked list entry now has to be linked to the new allocation unit. When data is transmitted from the logical buffer, it is always transmitted from the first buffer location (according to the definition of a FIFO buffer). The allocation unit is removed from the linked list and the new first allocation unit of the buffer is now the allocation unit to which the deleted unit was linked.

One disadvantage of linked lists is the additional storage space required to store the link list itself. Because access to the logical buffer space requires the accessing device to follow the linked list for that buffer, a certain latency time is inherent in reading from or writing to the logical buffer. System performance may be excessively degraded if there are multiple accesses to a logical buffer with a long linked list, as time will be expended chasing the linked list and the desired access speeds may therefore not be attainable. Also, the time required to access the list may make it difficult to timely add and remove entries from the linked list as the buffer allocation units are changed.

Another prior art approach to buffer management is simply using a dedicated storage area for each logical buffer. The storage space is sized to accommodate the expected buffer load and is not expandable nor contractible during operation. This technique can add considerable cost and space requirements to the system architecture. It also does not provide an efficient use of memory storage, as some logical buffers may be considerably and frequently under utilized, and further, the buffers cannot be resized while data is present within the buffer.

BRIEF SUMMARY OF THE INVENTION

The present invention presents a technique for relocating and resizing (also referred to as repartitioning) one or more logical buffers that comprise a memory space. The buffers are generally of different sizes and may be contiguous within the memory space. If there are no empty memory locations between two logical buffers, then one or more of the buffers may be moved so that another buffer can be expanded into the vacated locations. Logical buffer expansion can involve either raising the top memory location in the buffer to a higher memory location, or lowering the base memory location to a lower memory location, both of which require the availability of contiguous vacant memory space. Also, both the top and base memory locations can be raised/lowered. The entire logical buffer can be moved to a different area within the memory space by assigning new top and base locations within the memory space. However, the order of the buffers within the memory space cannot be changed. Essentially, the buffer can be grown to include vacant space at either end or shrunk to release vacant space at either end.

The buffers operate on a first-in-first-out (FIFO) basis, with a read address pointer indicating the next memory location from which data is to be read and a write pointer indicating the next memory location to which data is to be written. The read and write address pointers are incremented by one memory location after their respective operation has been completed. When a pointer reaches the top buffer memory location, it wraps back to the base memory location.

To move or resize a buffer according to the present invention, if certain conditions are satisfied (as discussed below), the base and the top memory addresses are changed to the requested or new base and/or requested or new top addresses to effectuate a move or resizing of the logical buffer. Several possible scenarios can arise. The logical buffer expands upwardly if the top address is modified to include memory space beyond the current top address. As the read and write pointers increment, they will move beyond the former top memory address to the new top memory address, after which they wrap back to the base location. If only the base address is modified by the addition of contiguous memory locations below the base location, the logical buffer will expand downwardly. Once the read and the write pointers reach the top memory address they will wrap back to the new base location. If both the top and base memory locations are modified so that contiguous memory locations are added to the buffer both above and below, then both of the processes as described above are executed. Thus according to the teachings of the present invention, the logical buffer can be expanded or contracted from either the top or base memory location, or from both memory locations. Note that during these move processes, either above, below or both, the data in the buffer is not moved to a different storage location. Only the top and base memory locations, that is, the boundaries of the buffer are expanded (or contracted), to increase the buffer size to accommodate the storage of more data. Thus more storage locations are made available for storing new data, but the existing buffer data does not move.

BRIEF DESCRIPTION OF THE DRAWINGS

The present invention can be more easily understood and the further advantages and uses thereof more readily apparent, when considered in view of the description of the invention and the following figures in which:

FIGS. 4A, 4B and 5 illustrate logical buffer locations before and after resizing and/or relocating;

DETAILED DESCRIPTION OF THE INVENTION

Figure 1:
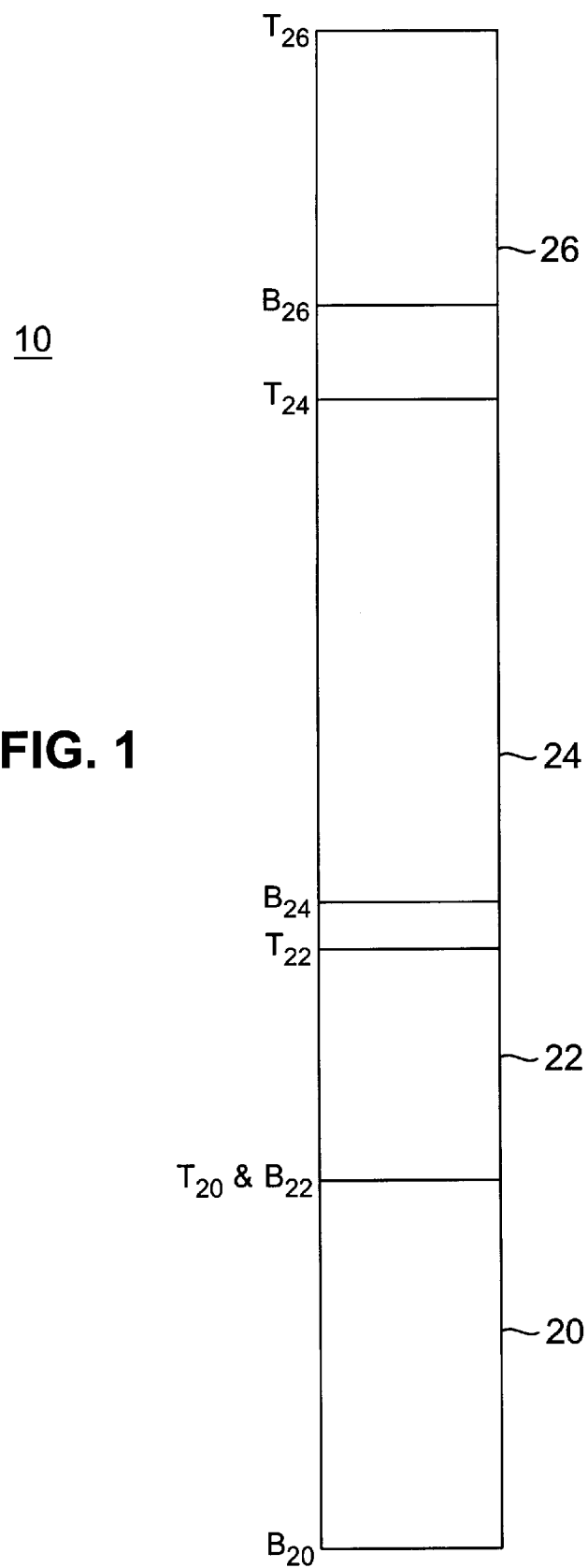
FIG. 1 is a memory space segregated into a plurality of logical buffers.

When used in a data network application, the logical buffers store data that is waiting for the availability of a network processor to service the stored data. For example, data is stored within a network switch while waiting for the switch fabric to transfer the data to the appropriate output port. The buffers can be sized based on the output data rate of the port with which they re associated. In general the buffer size and dynamic changes to the size are determined by the buffer application. A first buffer for storing data arriving at double the rate of the data arriving at a second buffer will generally be twice the size of the second buffer.

In certain applications it may be necessary to dynamically repartition (i.e., resize or relocate) the memory space, by expanding the size of one or more logical buffers. This might be required to provide more data storage space for an increased number of packets that are appearing at an input line. A change in buffer size can also be required to allow for a change in the media rate at an output port to limit data flow latency to the output wire. For example, when a media port asserts flow control, indicating that more data is being transmitted to the port than the port wire can handle, the transmitting processor should stop sending data to that port. But a finite time is required to signal the transmitting device to stop the data transmissions, and thus the data buffers at the port must be able to accommodate this additional data transmitted after the port has asserted flow control. If port buffers are resized to store this additional data flow, it is preferable that there is no loss of data stored in the buffers.

Each buffer operates as a first-in-first-out device and is defined by two addresses. The first address defines the base or lowest memory address for the buffer and the second address defines the top or highest memory element. For purposes of simplicity and ease in understanding, the top and base buffer addresses are referred to by the alphabetical letters B and T, followed by a subscript, which is the logical buffer reference character. For example $B_{20}$ is the base memory address for the logical buffer 20. Those skilled in the art know that generally the memory address locations utilize a binary numbering scheme.

Typically, a memory space is segmented into a plurality of logical buffers, and a controller (embodied in hardware or software) tracks the location of each buffer based on the top and base memory addresses of each buffer. Further, the controller will recognize the circumstances under which it is necessary to change the size of a buffer and determine whether there is sufficient contiguous memory space available to simply change the size in situ. According to the present invention, if sufficient contiguous space is not available, adjacent buffers can be moved or expanded/contracted to create free memory locations for expanding the buffer. Alternatively, the buffer of interest or the adjacent buffers can be moved to another location within the memory space where sufficient unused memory locations are available. The present invention provides for the relocating, expanding and contracting of the logical buffers, without loss of data, as necessary to accommodate circumstances that create a need for a larger buffer.

A circular resizable buffer according to the present invention is implemented by having the data wrap around the end of the buffer. In particular, when the base location of the buffer is written, the next address to write is the top location of the buffer. Correspondingly, when the base entry of the buffer is read, the next entry to read is the top or first address. The buffer is empty when the read and write addresses are equal. The buffer is full when the next write address is equal to the current read address. The buffer is "wrapped" whenever the write address is less than or trailing the read address. When the write address (the head) is ahead of the read (the tail) the buffer is not wrapped. "Wrapped" basically signifies that the actual data in the buffer includes the last address of the buffer and then "wraps" to the first address. The basic condition for changing the top and the base addresses according to the present invention is to detect when the data is not "wrapped" and also when the data currently in the buffers does not extend beyond either of the new addresses (in effect, verifying that the new addresses will not cause a "wrapped" condition).

A memory space 10 of FIG. 1 comprises four logical buffers, 20, 22, 24 and 26 as shown, with their corresponding base and top addresses. Note that in this example there are unassigned memory locations between the logical buffers 22 and 24, and between the logical buffers 24 and 26. The teachings of the present invention can be applied to memory spaces in which there are unassigned memory locations between the logical buffers and to memory spaces where the logical buffers are contiguous, so long as in the latter case vacant space is first made available for the buffer to expand into. It is known that the controller (not shown in FIG. 1) assigns the initial base and top address values to the logical buffers 20, 22, 24 and 26. Once the initial address values are assigned, the method and apparatus of the present invention operates to dynamically change the top and base addresses when one or more logical buffers requires more memory locations.

In addition to the top and base address for each buffer, there is also a read address or read pointer, that is, the address from which data is being read for processing and a write address or write pointer where data is written into the buffer. For example, in one application the data taken from the read address is input to a switch fabric for switching to the correct output port. The read address pointer is incremented one address space after each read operation. When the read address equals the top address of the logical buffer ($T_{xx}$), it wraps back around to the base address ($B_{xx}$). The read address is denoted herein by the letter R, followed by the logical buffer reference character in subscript form. The write address (or write pointer) is similarly denoted with a "W" followed by a subscript indicating the logical buffer. Like the read address, the write address also increments by one memory location after each write operation and wraps back to the lowest address of the logical buffer after reaching the highest memory address.

Typically the read and write processes occur at the same rate so that the logical buffer will not overflow. The processes of reading from and writing to the buffer are also referred to as draining and filling the buffer, respectively. Advantageously, a circular buffer according to the teachings of the present invention should not overflow. This can be accomplished by preventing an overflow by ensuring that the fill rate is less than or equal to the drain rate, or by enforcing circumstances that will avoid an overflow, such as discarding any write operation that will cause an overflow.

In the conventional application for these logical buffers, the write process occurs ahead of the read process. Thus the write address is referred to as the head address and the read address is referred to as the tail address. Generally, the head address is above the tail address. Otherwise the buffer is considered to be wrapped and resizing or relocating according to the present invention cannot be executed at that instant in time. But, so long as data is filling and draining there will be a time when the buffer is not wrapped and thus can be resized according to the present invention. For example, data is written to memory locations 1, 2 and 3 of a logical buffer as the write address pointer increments through the addresses 1, 2 and 3. The read process follows behind the write process. As the processor requests data from the buffer it is read from address locations 1, 2 and 3, in that order, to execute a FIFO process. Once the data has been read from a location and processed, that memory location is considered to be empty, that is, although the read process may have retained the data in the location, the data is no longer useful since it has already been read and processed. Thus according to the present invention these "empty" memory locations can be reused or the logical buffer resized and these locations deleted from the buffer.

Figure 2A:
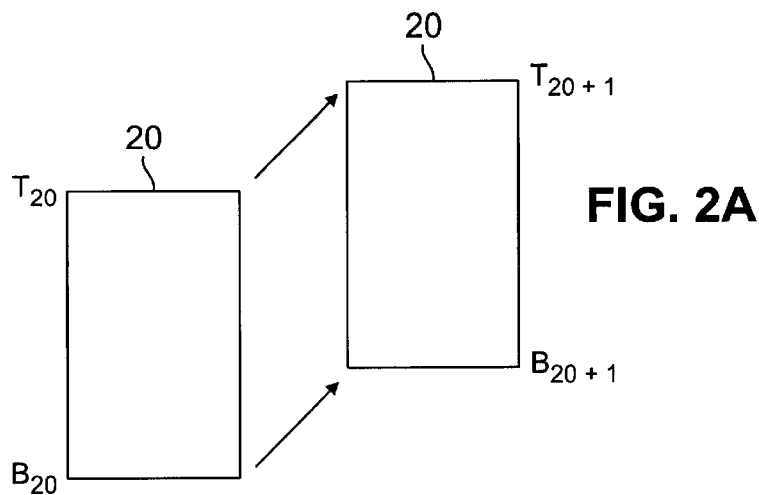
FIGS. 2A through 2E illustrate logical buffers before and after resizing and relocating.
Figure 2B:
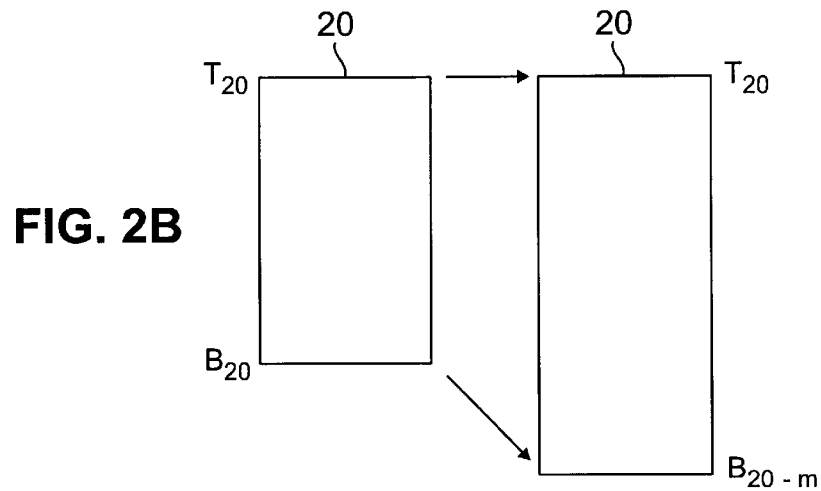
Figure 2C:
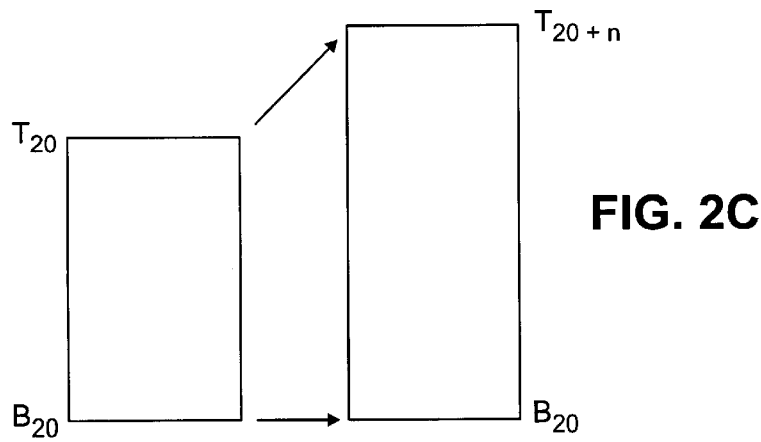
Figure 2D:
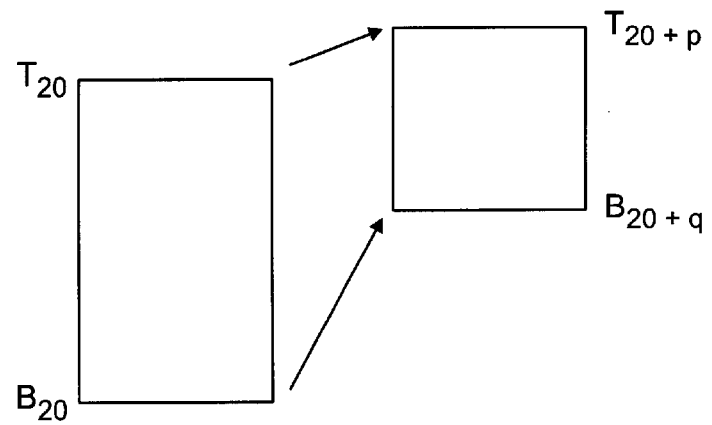
Figure 2E:
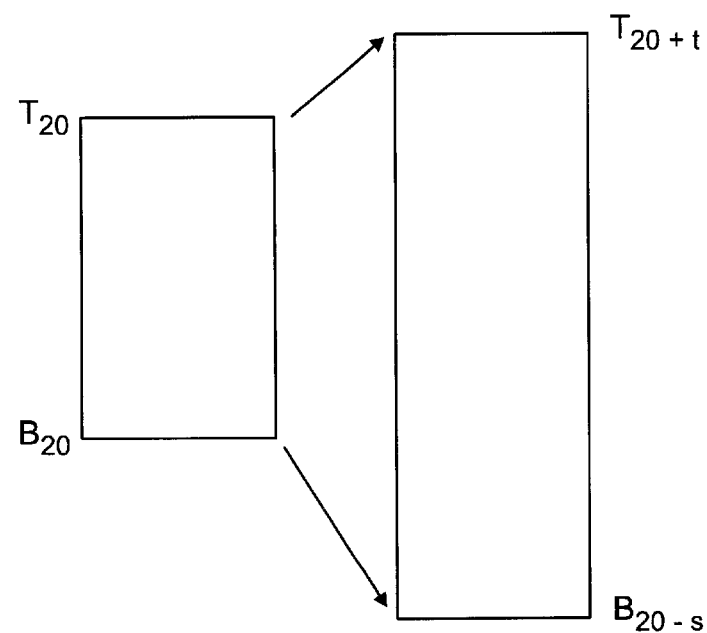

For the purpose of simplifying the description of the present invention, at this point the invention is considered with respect to a single logical buffer and the process for moving or resizing the buffer to a new location determined by a new address for the base memory location of the buffer, the top memory location of the buffer, or both the top and the base memory locations. Those skilled in the art recognize that these teachings can be applied to a plurality of buffers. There are several different scenarios under which the logical buffer can be moved and/or resized according to the teachings of the present invention, as illustrated in FIGS. 2A, 2B, 2C, 2D and 2E. In FIG. 2A both the top and the base addresses of the logical buffer 20 are moved to a higher location within the memory space while the block size remains unchanged. This is accomplished by adding the same value, "1", to both the base and the top memory location addresses, $B_{20}$ and $T_{20}$. FIG. 2B illustrates the scenario where the logical buffer 20 expands into lower memory locations with a lower base memory location $B_{20}-m$, and the top address location remains fixed. In FIG. 2C the logical buffer expands upwardly to the memory location address $T_{20}+n$ while the base address does not change. In FIG. 2D the top address moves up to $T_{20}+p$ and the base memory location moves up to $B_{20}+q$. The logical buffer size shrinks since $(p-q)$ is less than $(T_{20}-B_{20})$. In another scenario not shown in FIG. 2D, the top end of the buffer 20 remains at location $T_{20}$ and the base end moves to $B_{20}+q$. In FIG. 2E the logical buffer expands in both directions to a base location at $B_{20}-s$ and a top address at $T_{20}+t$.

Figure 3:
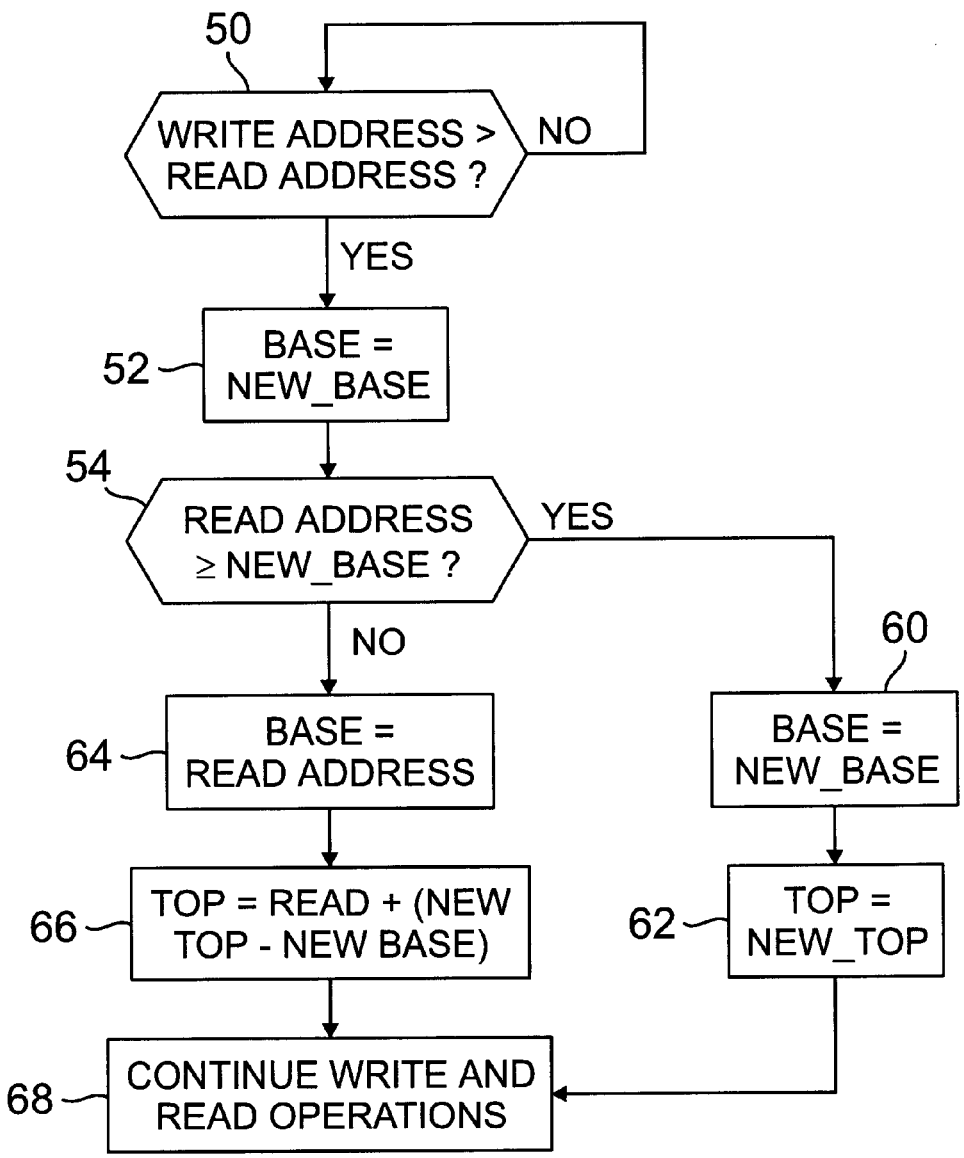
FIG. 3 is a flow chart of the buffer resizing process according to the teachings of the present invention.

FIG. 3 is a flowchart setting forth the steps for moving a logical buffer upwardly as illustrated in FIG. 2A without changing the buffer size. The flowchart input parameters include the current base and the top memory locations for the logical buffer 20. The parameters new_base and new_top are the requested memory locations to which the logical buffer is to be moved. Certain conditions of the logical buffer, as described in the flowchart, will prevent movement of the logical buffer to both the new_base and the new_top locations.

To move the logical buffer 20 upwardly, it is first necessary to determine whether the write address of the logical buffer 20 is greater than or less than the read address. Generally, in operation the write address is larger than the read address, as data is first written into the buffer before it is read from the buffer. If the read address is greater than the write address, then the logical buffer is in a wrapped state and cannot be moved until unwrapped. Thus, this decision is made as set forth at a decision step 50 of FIG. 3. If the result is negative, then processing continues back through the decision step 50 until the logical buffer is in a unwrapped state. Since the logical buffer is in continual use as data is being written to it and read from it, the unwrapped condition will not prevail for an extended period.

When unwrapped, the result from the decision step 50 is affirmative and processing moves to a step 52 where the base address of the logical buffer 20 is set equal to the requested new_base memory location.

At a decision step 54, the read address is compared with the new_base location. If the read address location is greater than the new_base memory location then the logical buffer base location can be moved upwardly without loss of data, because the memory locations between the base location and the read pointer have already been read and thus are no longer needed. Recall that the decision step 50 has already ensured that the write address is ahead of the read address. But if the new_base location is above the read address then the data stored in those memory location between the new_base location and the read address would be lost if the buffer was moved. The relationship between the read address and the new_base address is determined by the decision step 54 and the scenario is illustrated in FIG. 4A where a read address pointer is shown below the new_base address. Note that if the logical buffer was moved under these conditions, the base address moves from the current location to the new_base location and data in a region 58 is lost because the read pointer is now outside the logical buffer 20, as shown in FIG. 4B. Once the buffer controller realizes this, the read pointer is moved to the closet active memory location within the buffer 20, which now is the new_base address, causing the data in the region 58 to be lost.

In the event the read address is below or lower than the new_base memory location (the result from the decision step 54 is negative), then the process moves to a step 64 where the base memory location is set equal to the read address, thus avoiding the situation where the new base address is above the read pointer when the buffer is moved. See FIG. 5. Once the base memory location is established, the top location is correspondingly moved at a step 66. To retain the logical buffer size, the top location is set equal to the read address plus the difference between the new_top and new_base values. In another embodiment it is not required to maintain the buffer size and thus the new top address can be determined as required. At the step 68 the relocation of the logical buffer 20 has been completed and read and write operations continue.

If the read address pointer is above the new_base value then the result from the decision step 54 is affirmative and processing moves to a step 60 where the base address of the logical buffer 20 is relocated to the new_base value. To accomplish this, at the step 60 the base address is set equal to the requested new_base memory address. At a step 62, the top memory address is changed to the requested new_top address. Processing now continues to a step 68 where data is written to and read from the logical buffer 20. Both the read and the write address pointers will continue to increment through the old buffer memory locations until reaching the old top address. At this point they are wrapped to the new_base location and continue to increment up through the buffer addresses until reaching the new_top location, at which point they wrap back to the new_base location.

Figure 6:
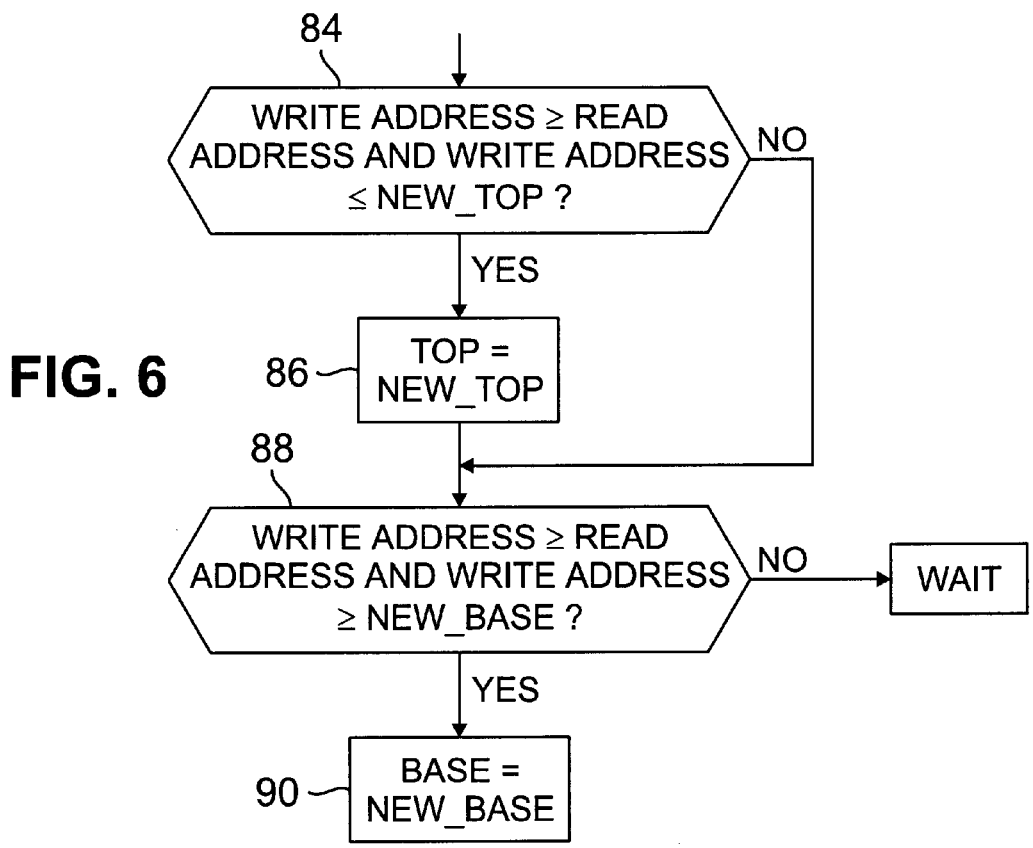
FIG. 6 is a flow chart of a buffer relocating process according to the teachings of the present invention.

FIG. 6 is a software flowchart illustrating the process for resizing the logical buffer in one or both directions as shown in FIGS. 2B, 2C and 2D. The values new_top and new_base are the requested locations into which the logical buffer is to be moved. The process begins at a decision step 84 where the write address is compared with the read address to determine if the former is greater or equal to the latter (i.e., is the buffer wrapped), and the write address is compared with the new_top address to determine whether the former is less than or equal to the latter. If the result of both decisions is positive, then it is safe to adjust the top address of the buffer. Thus at a step 86, the top address of the buffer is set equal to the new top value.

If the result from the decision step 84 is negative then the process moves to a decision step 88 where the write address is compared to the read address, and the read address is compared to the new_base address. If the write address is greater than or equal to the read address and the read address is greater than or equal to the new_base address, then it is safe to move the base address. Thus at a step 90 the base address is set equal to the new_base value and the buffer move is complete. A negative result from the decision step 88 moves processing back to the start of the flowchart.

These changes in the top and base addresses as depicted in FIG. 6 can occur in either order. In particular, if the buffer is moving up, the top adjustment will often occur before the base adjustment (that is, expand the top, wait for the data to move out of the way and then move the base up). Conversely if the buffer is to be moved down, the base is expanded, then wait for the data to move out of the buffer until the remaining data is near the new base address (and hence the top end of the buffer is empty) and then move the top down.

As discussed with respect to FIG. 1, typically there are a plurality of logical buffers constituting a memory space 10. If the logical buffers are contiguous, for example the logical buffers 20 and 22, then to expand the logical buffer 20 upwardly as shown in FIG. 2C and described in the flowchart of FIG. 6, it would first be necessary to move the logical buffer 22 or at least to move it to a higher base memory location to provide space for the logical buffer 20 to move in to. However, the logical buffer 24 can be expanded upwardly to occupy the memory locations between location $T_{24}$ and $B_{26}$ without the requirement to move any other logical buffers. Thus the expansion and movement of the logical buffers in a memory space must be executed in conjunction with consideration of the location and size of the other buffers occupying the same memory space. A buffer controller is required to manage the individual logical buffers to optimize each one based on the expected data storage requirements of each logical buffer and the available memory resources.

Figure 7:
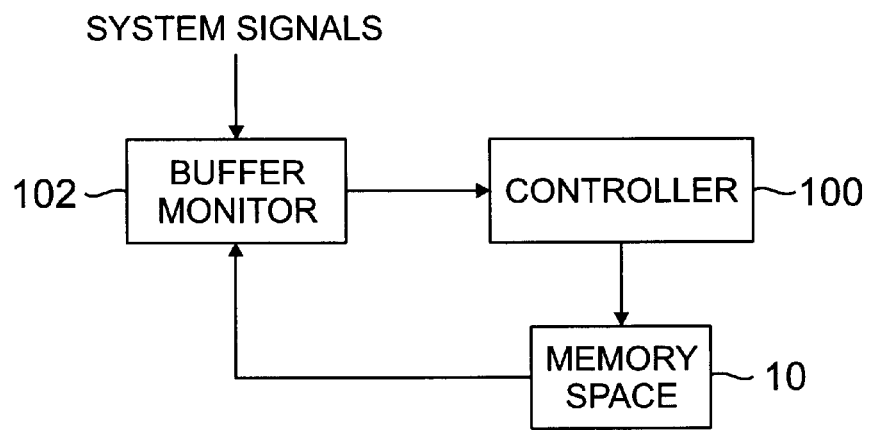
FIG. 7 is a block diagram showing the memory space and the elements for controlling the logical buffers within the memory space.

An example of one such controller is depicted in FIG. 7, where a controller 100 provides input signals to the memory space 10 for establishing the base and top memory locations for each logical buffer. The signals also include the new_top and new_base values and the buffer number. A buffer monitor 102 is responsive to the memory space 10 for monitoring the operation of the various buffers therein and for determining, based on predetermined algorithms, whether the size of a particular buffer should be increased or decreased. For example, if a buffer frequently exhausts its available storage locations, thus losing data packets, which must therefore be resent from the source, then the buffer monitor 102 instructs the controller 100 to reallocate the memory locations within the memory space 10 to provide additional memory locations for the buffer. This reallocation is accomplished, according to the present invention, by expanding the top memory location, the bottom memory location, or both the top and bottom memory locations, or by relocating the buffer to a different area of the memory space 10 and assigning it additional memory locations there. The buffer monitor 102 is also responsive to one or more system signals that provide system usage information that could be useful in determining the size of the logical buffers within the memory space 10. For example, if a new high speed device is added to the system and will be contending for service on one of the system resources, it may be necessary to increase the size of the buffer supporting the new device to avoid buffer overflows and lost data.

In another embodiment, the teachings of the present invention can be executed in software according to the flowcharts of FIGS. 3 and 6. The software program can be executed on a dedicated processor for controlling the buffer locations within the memory space 10. Alternatively, the software program can be executed on a time-shared basis on a processor associated with the system to which the memory space is related.

What is claimed is:

1. A method for changing at least one of a base address and a top address of a memory buffer to a new base address or a new top address, wherein a plurality of memory buffers occupy adjacent locations in a memory space, and wherein data is written to a first buffer of the plurality of buffers at a write address and read from the first buffer at a read address on a first-in-first-out basis, and wherein the write and the read addresses wrap back to the base address upon reaching the top address, said method comprising:

determining if the write address bears a first predetermined relationship to the read address;

determining if the read address bears a second predetermined relationship to the new base address;

determining if the new base address is within a memory space of a second buffer of the plurality of buffers; and if the write address bears the first predetermined relationship to the read address, the read address bears the second predetermined relationship to the new base address, and the new base address is not within the memory space of the second buffer, changing the base address to the new base address.

2. The method of claim 1 wherein the first predetermined relationship includes the write address is greater than or equal to the read address.

3. The method of claim 1 wherein the second predetermined relationship includes the read address is greater than or equal to the new base address.

4. The method of claim 1 wherein the write address and the read address are incremented following a respective read or write operation.

5. The method of claim 1 wherein if the read address does not bear the second predetermined relationship to the new base address, setting the base address to the read address.

6. The method of claim 5 wherein if the read address does not bear the second predetermined relationship to the new base address and the buffer size is to remain unchanged, setting the top address to the sum of the read address and the difference between the new top address and the new base address.

7. A method for changing at least one of the base address and the top address of a memory buffer to a new base address or a new top address, wherein data is written to the buffer at a write address and read from the buffer at a read address on a first-in-first-out basis, and wherein the write and the read addresses wrap back to the base address upon reaching the top address, said method comprising:

determining if the write address bears a first predetermined relationship to the read address;

determining if the write address bears a second predetermined relationship to the new top address; and if the write address bears the first predetermined relationship to the read address and the write address bears the second predetermined relationship to the new top address, setting the top address to the new top address.

8. The method of claim 7 wherein the first predetermined relationship includes the write address is greater than or equal to the read address.

9. The method of claim 7 wherein the second predetermined relationship includes the write address is less than or equal to the new top address.

10. The method of claim 7 wherein the write address and the read address are incremented following a respective read or write operation.

11. In a memory space comprising a plurality of buffers, each comprising a plurality of storage locations between a base storage location and a top storage location, wherein data is written to a storage location at a write address and read from a storage location at a read address on a first-in-first-out basis, and wherein the write and the read addresses wrap back to the base storage location upon reaching the top storage location, a method for reallocating the storage locations assigned to one of the plurality of buffers, said method comprising:

determining the availability of free storage locations adjacent to at least one of the base storage location and the top storage location;

moving the base storage location to a new base storage location in an available free storage location in response to the write address greater than or equal to the read address and in response to the read address greater than or equal to the new base storage location.

12. The method of claim 11 wherein the plurality of buffers are contiguous and the size of at least one of the plurality of buffers is reduced to create free storage locations.

13. The method of claim 11 wherein at least two of the plurality of buffers are separated by free storage locations.

14. The method of claim 11 wherein data is read from and written to each one of the plurality of buffers, and wherein after data is read from a storage location of one of the plurality of buffers, the storage location is considered a free storage location.

15. The method of claim 11 wherein the storage locations in one of the plurality of buffers that are located between the base storage location and the read address pointer are considered free storage locations.

16. The method of claim 11 wherein the base storage location and the top storage location are both changed to encompass a plurality of free contiguous storage locations.

17. The method of claim 11 wherein the top storage location of one of the plurality of storage buffers is moved to a new top storage location, said method further comprising:

determining if the write address of the buffer bears a first predetermined relationship to the read address thereof;

determining if the write address of the buffer bears a second predetermined relationship to the new top storage location; and if the write address bears the first predetermined relationship to the read address and the write address bears the second predetermined relationship to the new top storage location, setting the top storage location to the new top storage location.

18. The method of claim 17 wherein the first predetermined relationship includes the write address is greater than or equal to the read address.

19. The method of claim 17 wherein the second predetermined relationship includes the write address is less than or equal to the new top address.

20. A method for resizing a memory buffer in a memory system comprising a plurality of memory buffers, each memory buffer comprising a plurality of memory locations between a base address and a top address, wherein data is written to a memory location at a write address and read from a memory location at a read address on a first-in-first-out basis, and wherein the write and the read addresses wrap back to the base address upon reaching the top address, said method comprising:

resizing a first memory buffer comprising a first plurality of memory locations to a second plurality of memory locations, wherein the step of resizing comprises:

changing a first base address to a second base address if the write address is greater than or equal to the read address and if the read address is greater than or equal to the second base address or changing a first top address to a second top address if the write address is greater than or equal to the read address and the write address is less than or equal to the new top address; and resizing a second memory buffer such that the second memory buffer comprises one or more of the first plurality of memory locations.

21. A controller for resizing a memory buffer in a memory system comprising a plurality of memory buffers, each memory buffer comprising a plurality of memory locations between a base address and a top address, wherein data is written to a memory location at a write address and read from a memory location at a read address on a first-in-first-out basis, and wherein the write and the read addresses wrap back to the base address upon reaching the top address, said controller comprising:

a controller element for resizing a first memory buffer comprising a first plurality of memory locations to a second plurality of memory locations by changing a first base address to a second base address if the write address is greater than or equal to the read address and if the read address is greater than or equal to the second base address, or by changing a first top address to a second top address if the write address is greater than or equal to the read address and the write address is less than or equal to the new top address; and the controller element for resizing a second memory buffer such that the second memory buffer comprises one or more of the first plurality of memory locations.

* * * * *